UNITED STATES PATENT OFFICE

WINFRID HENTRICH, OF WIESDORF-ON-THE-RHINE, AND JOSEPH HILGER, OF COLOGNE-MULHEIM, GERMANY, ASSIGNORS TO GENERAL ANILINE WORKS, INC., OF NEW YORK, N. Y., A CORPORATION OF DELAWARE

POLY-AZO DYESTUFFS

No Drawing. Application filed June 27, 1928, Serial No. 288,803, and in Germany July 13, 1927.

Our invention relates to new polyazo dyestuffs and a process of preparing the same. More particularly it relates to the azo dyestuffs of the general formula:

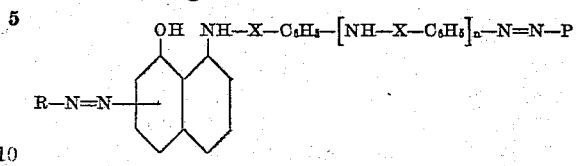

wherein R stands for the residue of an azo compound containing in its complex a benzene or naphthalene nucleus in which two para-positions are substituted by azo groups, and which is furthermore substituted by an ether group; one X represents the CO-group; the other two X's represent CO or —CO—NH—; $n$ represents the numeral 1 or 2, P stands for a coupling component of the group consisting of the pyrazolones, aceto acetic acid arylamides, the methylketol compounds, sulfazones, 1.3-dihydroxyquinoline and such salicylic acid compounds as are capable of being coupled, and wherein the aromatic nuclei may be further substituted by substituents selected from the group consisting of halogen, alkyl, alkoxy, substituted alkoxy, the thio ether group, the sulfonic acid group and the carboxylic acid group.

The new dyestuffs are obtainable by coupling a diazo or diazoazo compound with an amino ether or amino thioether of the benzene or naphthalene series which is capable of coupling in the para-position to the amino group, diazotizing the azo compounds thus obtained and coupling it with an N-amino-benzoyl-amino-benzoyl-amino-benzoyl-peri-amino-naphthol or an N-amino-benzoyl-amino-benzoyl-peri-amino-naphthol, in which compound one or more of the —CO.NH— linkages can be replaced by the —NH.CO.NH— group and which may contain substituents in the naphthalene or in the benzene nucleus, then diazotizing again and finally coupling suitably with a pyrazolone, a derivative of a β-ketonic aldehyde, methyl ketol or an analogue or substitution product thereof, a sulfazone, 1.3-dihydroxy-quinoline, salicylic acid or a derivative thereof. The final diazotization and coupling may be effected on the fibre, in which case a coupling component is employed, containing a reactive methylene group, but no sulfonic acid group.

Valuable green tris- and tetrakisazo dyestuffs, distinguished by a high affinity for the vegetable fibre and very good fastness to light, are thus obtained.

The N-amino-benzoyl-amino-benzoyl-amino-benzoyl-peri-amino-naphthol- and N-amino-benzoyl-amino-benzoyl-peri-amino-naphthol can, for example, be compounds of the following formulæ:

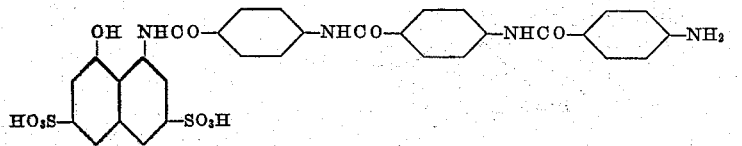

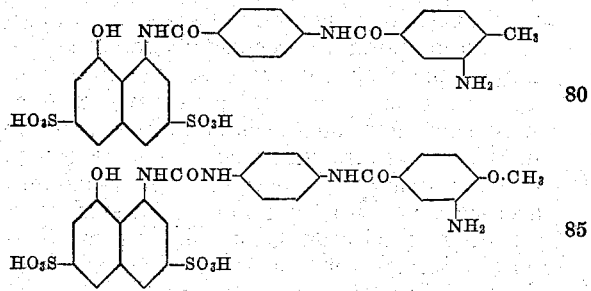

Among the amino-ethers of the benzene series applicable as intermediate components may be mentioned, for example, 3-amino-4-methoxy-1-methyl-benzene or the corresponding ethoxy or hydroxy-ethoxy compound or the sulfuric acid ester thereof of the following formula:

or also the (4-methyl-2-amino-phenoxy)-β-propionic acid:

and similar compounds.

Among the compounds of the naphthalene series may be mentioned the following: 1-amino-2-hydroxy-naphthalene-ethyl-ether, the (1-amino-2-naphthoxy)-β-propionic acid:

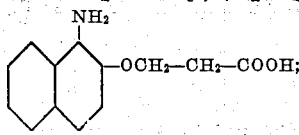

the sulfonic acid ester of 1-amino-2-naphthol-hydroxy-ethyl ether:

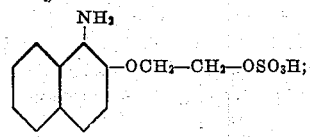

the 6- (or 7-) monosulfonic acids of all these 1-amino-2-naphthol ethers, or also the 1-amino-7-naphthol-methyl-ether:

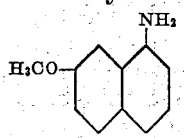

and finally thioethers, such as

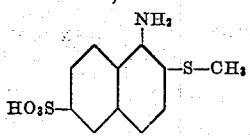

A form of execution of the process consists in diazotizing the aminodisazo- or aminotrisazo compounds described above, after dyeing or printing the same on the fibre and then developing in the customary manner with such compounds as contain a reactive methylene group, but no sulfonic acid group, as, for example, methylphenylpyrazolone, acetoacetic acid-ortho-anisidide or sulfazone. In this manner dyeings or printings are likewise obtained, the shades of which are very fast to washing, soaping and light. The printings possess the important property of being capable of pure and permanent white discharge.

In the new series of generally green tris- and tetrakisazo compounds produced according to the above process are dyestuffs of extraordinary purity and yellow tinge. Until now it has been impossible to obtain such shades with any uniform substantive green dyestuff, either by direct dyeing or developing.

The following examples illustrate our invention, without limiting it thereto:—

*Example 1.*—482 parts by weight of the azo dyestuff obtained from diazotized 1-amino-8-naphthol-3.6-disulfonic acid and 3-amino-4-cresol-ethyl-ether are diazotized in the customary manner. The diazo compound is coupled at 5° C. with a solution prepared from 575 parts by weight of 4″-amino-benzoyl-4′-amino-benzoyl-1-amino-8-napthol 3.6-disulfonic acid, 5000 parts by weight of water, 60 parts by weight of concentrated ammonia and 1100 parts by weight of pyridine. The formation of the dyestuff takes place immediately accompanied by a deep blue coloration of the solution. The resulting dyestuff is salted out, filtered and then dissolved in water. 70 parts by weight of sodium nitrite are added, after which the solution is acidified with hydrochloric acid at room temperature. Diazotization is soon complete; after stirring for one hour the diazodisazo compound is salted out, filtered and made into a paste with a little water, the paste being added with stirring to a solution of 217 parts by weight of the pyrazolone obtained from meta-hydrazine-benzoic acid and acetoacetic ester, in 5000 parts by weight of water and 300 parts by weight of sodium carbonate. Coupling proceeds quickly, yielding a clear green dyestuff, which is worked up in the customary manner. The dyestuff dyes the vegetable fibre very well, a clear green of excellent fastness to light resulting.

A very remarkable green direct dyeing dyestuff is obtained by replacing in the above example the 1.8-amino-naphthol-3.6-disulfonic acid by the 1.8-amino-naphthol-5.7-disulfonic acid, the 3-amino-4-cresol-ethyl-ether by the (4′-methyl-2′-amino-phenyl)-β-propionic acid and the 4″-amino-benzoyl-4′-amino-benzoyl-1-amino-8-hydroxy-naphtalene-3.6-disulfonic acid by the compound:

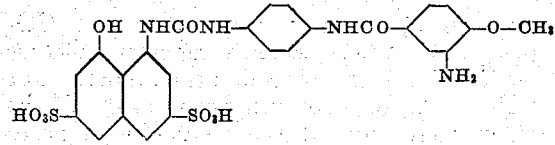

and finally the 3′-carboxy-phenyl-methyl-pyrazolone by the pyrazolone obtained from 4-chloro-2-hydrazine-benzoic acid and acetoacetic ester. A very clear green dyestuff is likewise obtained very fast to light and dyeing well on cotton.

The combination 1-amino-8-hydroxy-naphthalene-3.6-disulfonic acid+3-amino-4-cresol-hydroxyethyl-ether of the formula:

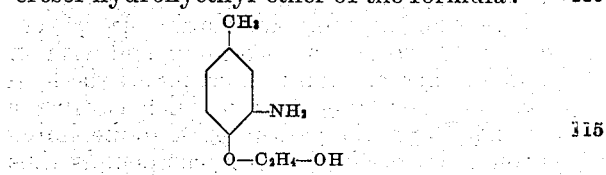

+1-amino-napthalene-7-sulfonic acid+4″-amino-benzoyl-4′-amino-benzoyl-4-amino-benzoyl-1-amino-8-hydroxy-naphthalene-3.6-di-sulfonic acid+the pyrazolone obtained from 5-hydrazine-3-methoxy-2-hydroxy-benzoic acid and acetoacetic ester of the formula:

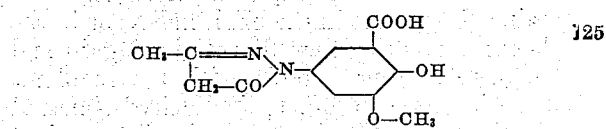

produced in the same manner dyes cotton, for example, from a sodium sulfate bath, in clear green shades which are even more fast to light.

Valuable clear green dyeings fast to light and washing are obtained by dyeing the fibre from a sodium sulfate bath with the disazo dyestuff (for example, that from 1.8-amino-naphthol-4.7-disulfonic acid, 3-amino-4-cresol-ethyl-ether and 4″-amino-benzoyl-4′-amino-benzoyl-1-amino-8-naphthol-3.6-disulfonic acid), diazotizing on the fibre and developing with methyl-phenyl-pyrazolone.

*Example 2.*—The diazoazo compound produced in the customary manner from 520 parts by weight of the azo dyestuff from diazotized 4.5-dichloro-analine-2-sulfonic acid and 1-amino-2-naphthol-ethyl-ether-6-sulfonic acid, is combined at 5 to 10°C. with a solution prepared from 575 parts by weight of 4″-amino-benzoyl-4′-amino-benzoyl-1-amino-8-hydroxy-naphthalene-3.6-disulfonic acid, 5000 parts by weight of water, 60 parts by weight of concentrated ammonia and 1100 parts by weight of pyridine. The formation of the very clear, greenish blue azo dyestuff takes place instantaneously; the same is salted out and worked up in the customary manner. The dyestuff dyes cotton well in greenish blue shades. By diazotizing the dyeing on the fibre in the customary manner and developing with 3-methyl-1-phenyl-5-pyrazolone an exceptionally clear yellowish green is obtained, very fast to washing and light. Printings of the dyestuff, produced in an analogous manner are very fast to soaping and capable of pure white discharge.

Similar and in some cases even clearer dyestuffs are produced by replacing 4.5-dichloro-aniline-2-sulfonic acid by aniline-2-sulphonic acid, or 3-chloro-2-amino-toluene-5-sulfonic acid or 1.3-dimethyl-4-amino-benzene-5-sulfonic acid, or 2-amino-naphthalene-8-sulfonic acid, or 1-amino-naphthalene-2-sulfonic acid or also by the amino monoazo dyestuff from 2-amino-naphthalene-8-sulfonic acid and 3-toluidine or by a similar compound. The 1-amino-2-naphthol-ethyl-ether-6-sulfonic acid can be replaced by the amino-naphthol-ethers above mentioned and instead of the 4″-amino-benzoyl-4′-amino-benzoyl-1-amino-8-hydroxy-naphthalene-3.6-disulfonic acid a thrice benzoylated compound of this kind such as a compound of the formula:

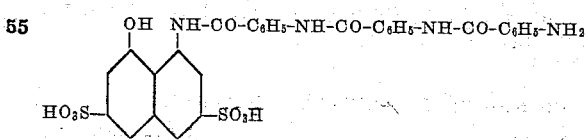

can be used.

*Example 3.*—The diazo-azo compound prepared as described in Example 3 from 520 parts by weight of the azo dyestuff from diazotized 4.5-dichloro-aniline-2-sulfonic acid and 1-amino-2-naphthol-ethyl-ether-6-sulfonic acid, is coupled in accordance with the directions of the previous examples with 587 parts by weight of 3″-amino-4″-methoxy-benzoyl-4′-amino-benzoyl-1-amino-8-hydroxy-naphthalene-3.6-disulfonic acid of the formula:

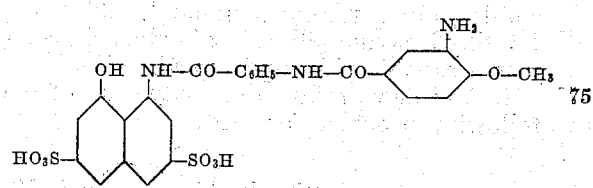

A disazo dyestuff results, dyeing cotton a clear greenish blue, which when diazotized on the fibre and developed with methyl-phenyl-pyrazolone yields a very pure green fast to washing and light.

By using as the first component the tetrazotized 4.4′-diamino-diphenyl-urea-3.3′-disulfonic acid of the formula:

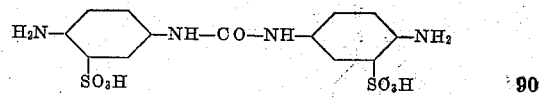

a greenish blue dyestuff is likewise obtained, which on developing with methyl-phenyl-pyrazolone on the fibre yields a particularly clear green very fast to light, washing and topping. The shade is somewhat more yellow than that of the dyestuff in the above example.

Green dyeings on cotton which are likewise pure and fast are obtained by coupling the diazotized 4-amino-2-sulfo-oxanilic acid:

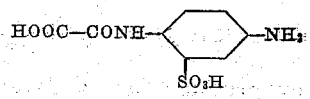

with 1-amino-naphthalene-methyl-thio-ether, further diazotizing and coupling with 4″-aminobenzoyl-3′-amino-4′-methoxy-benzoyl-1-amino-8-hydroxy-naphthalene-3.6-disulfonic acid, dyeing the resulting bluish green amino disazo dyestuff in the customary manner, diazotizing on the fibre and developing with methyl-phenyl-pyrazolone.

We claim:

1. In a process for producing polyazodyestuffs, the step which comprises coupling a further diazotized aminoazo-compound being obtained from a compound of the group consisting of diazo and diazoazo compounds and from an ether of the group consisting of oxy and thio ethers of the benzene and naphthalene series, coupling in para-position to the amino group with a compound of the group consisting of N-aminobenzoyl-amino-benzoyl-amino-benzoyl-peri-amino-naphthol and N-amino-benzoyl-amino-benzoyl-peri-amino-naphthol in which compounds a part of the —CO—NH— linkages may be substituted by —NH—CO—NH— linkages and in which the naphthalene and benzene nuclei may be further substituted by substituents selected from the group consisting of halogen, alkyl, alkoxy, substituted alkoxy, the thio ether group, the sulfonic acid group and the carboxylic acid group, rediazotizing and coupling with a compound of the group consisting of pyrazolones, aceto acetic acid arylamides, a methylketol compound, sulfazones, 1.3-dihydroxyquinoline, a salicylic acid compound capable of being coupled.

2. As a new product the azodyestuff of the following probable formula:

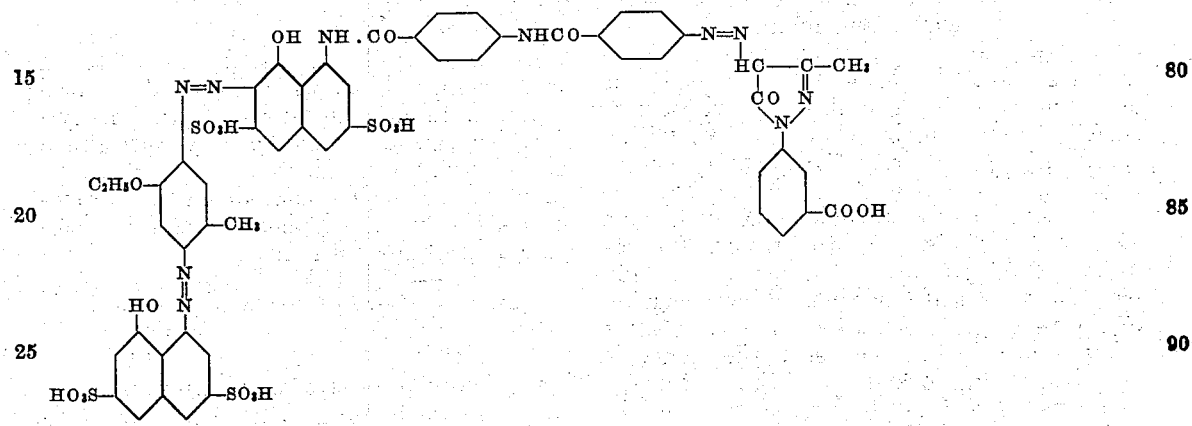

which is in a dry state a dark powder of a bronze-like luster, easily soluble in water dyeing cotton clear green shades very fast to light.

3. As new products the azo dyestuffs of the general formula:

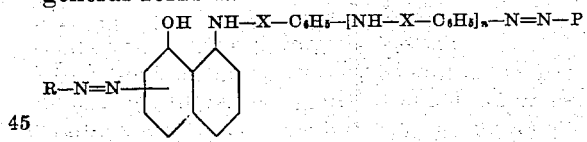

wherein R stands for the residue of an azo compound containing in its complex a benzene or naphthaline nucleus in which two para-positions are substituted by azo groups, and which is furthermore substituted by an ether group, one X represents the CO-group, the other two X's represent CO or —CO—NH—, n represents the numeral 1 or 2, P stands for a coupling component of the group consisting of the pyrazolones, aceto acetic acid arylamides, the methylketol compounds, sulfazones, 1.3-dihydroxyquinoline and such salicylic acid compounds as are capable of being coupled and wherein the aromatic nuclei may be further substituted by substituents selected from the group consisting of halogen, alkyl, alkoxy, substituted alkoxy, the thio ether group, the sulfonic acid group and the carboxylic acid group, the said new products being in the dry state dark powders of a bronze-like luster, being easily soluble in water with a clear green coloration, and dyeing cotton extremely green shades having a yellow tint.

4. As new products the azo dyestuffs of the general formula:

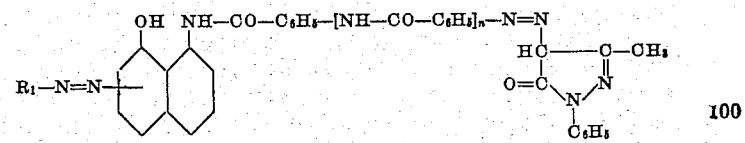

wherein $R_1$ stands for the residue of an azo compound containing in its complex a benzene or naphthalene nucleus in which two para-positions are substituted by azo groups, and which is furthermore substituted by an ether group, n represents the numeral 1 or 2 and wherein the aromatic nuclei may be further substituted by substituents selected from the group consisting of halogen, alkyl, alkoxy, substituted alkoxy, the thio ether group, the sulfonic acid group and the carboxylic acid group, the said new products being in the dry state dark powders of a bronze-like luster, being easily soluble in water with a clear green coloration and dyeing cotton extremely green shades having a yellow tint.

5. As new products the azo dyestuffs of the general formula:

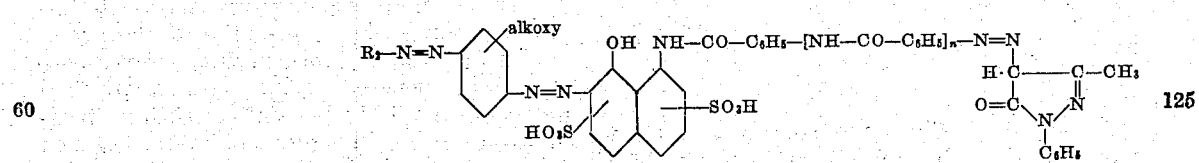

wherein $R_2$ represents a benzene or naphthalene nucleus which may be substituted by halogen, alkyl, the hydroxy group or the sulfonic acid group and $n$ represents the numeral 1 or 2, the said new products being in the dry state dark powders of a bronze-like luster, being easily soluble in water with a clear green coloration and dyeing cotton extremely green shades having a yellow tint.

6. As new products the azo dyestuffs of the general formula:

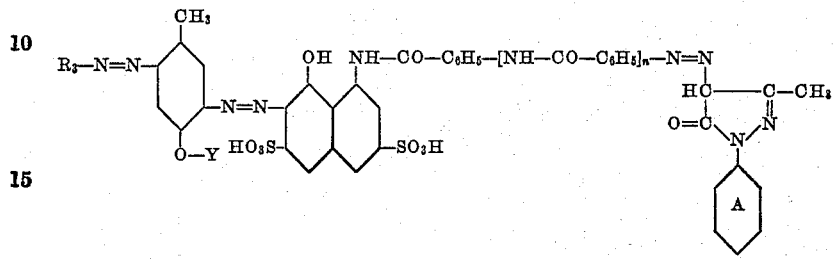

wherein $R_3$ represents a benzene or naphthalene nucleus which may be substitued by halogen, alkyl, the hydroxy group or the sulfonic acid group, $n$ represents the numeral 1 or 2, Y represents alkyl, alkylene.OH, alkylene.O.SO$_3$H, alkylene.COOH and wherein the benzene nucleus A may be substituted by the carboxylic acid group, halogen, alkyl or alkoxy, the said new products being in the dry state dark powders of a bronze-like luster, being easily soluble in water with a clear green coloration and dyeing cotton extremely green shades having a yellow tint.

In testimony whereof we have hereunto set our hands.

WINFRID HENTRICH.
JOSEPH HILGER.